(12) United States Patent
Osawa

(10) Patent No.: US 8,616,790 B2
(45) Date of Patent: Dec. 31, 2013

(54) IMAGE PICKUP APPARATUS AND INTERCHANGEABLE LENS

(75) Inventor: Toshifumi Osawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 53 days.

(21) Appl. No.: 13/069,086

(22) Filed: Mar. 22, 2011

(65) Prior Publication Data

US 2011/0170853 A1 Jul. 14, 2011

Related U.S. Application Data

(63) Continuation of application No. PCT/JP2010/067823, filed on Oct. 12, 2010.

(30) Foreign Application Priority Data

Nov. 25, 2009 (WO) ................ PCT/JP2009/069867

(51) Int. Cl.
*G03B 17/00* (2006.01)
*G03B 17/14* (2006.01)

(52) U.S. Cl.
USPC .......................................... 396/529; 396/532

(58) Field of Classification Search
CPC ............................... G03B 17/00; G03G 17/14
USPC .................................................. 396/529, 532
See application file for complete search history.

(56) References Cited

U.S. PATENT DOCUMENTS

| | | | | |
|---|---|---|---|---|
| 5,214,464 A | * | 5/1993 | Karasaki et al. | 396/92 |
| 5,781,818 A | * | 7/1998 | Kobayashi | 396/529 |
| 6,707,992 B2 | * | 3/2004 | Uenaka et al. | 396/71 |
| 6,734,912 B1 | * | 5/2004 | Kanayama et al. | 348/361 |
| 7,467,900 B2 | * | 12/2008 | Higuma | 396/529 |
| 8,374,499 B2 | * | 2/2013 | Sakamoto | 396/532 |

FOREIGN PATENT DOCUMENTS

| | | | | |
|---|---|---|---|---|
| JP | 6-205073 A | | 7/1994 | |
| JP | 1994-205073 | * | 7/1994 | H04L 29/08 |
| JP | 8-129199 A | | 5/1996 | |
| JP | 1996-129199 | * | 5/1996 | G03B 17/00 |
| JP | 2002-152576 A | | 5/2002 | |
| JP | 3658084 B2 | | 6/2005 | |
| JP | 2009-258558 | * | 11/2009 | G03B 17/14 |
| JP | 2009-258558 A | | 11/2009 | |
| JP | 2011-257544 | * | 6/2010 | G03B 17/00 |
| WO | 2009-130849 A1 | | 10/2009 | |

OTHER PUBLICATIONS

International search report; Dec. 28, 2010.

* cited by examiner

*Primary Examiner* — Clayton E Laballe
*Assistant Examiner* — Kevin Butler
(74) *Attorney, Agent, or Firm* — Canon USA Inc. IP Division

(57) ABSTRACT

When communication is made between a camera and an interchangeable lens by a conventional synchronization method, an operation for checking Busy is required between communications, and operating performances of the camera and interchangeable lens may not be occasionally improved. Provided is a camera and interchangeable lens system in which a communication method between a camera and an interchangeable lens can be changed to one of synchronous communication and asynchronous communication. The synchronous communication is made first while the camera serves as a master. The camera measures a time interval of a signal pulse output from the lens at a predetermined time interval in response to a command from the camera to the interchangeable lens for change of the communication to the asynchronous communication. The camera determines a baud rate for the asynchronous communication and then changes the communication method between the camera and the interchangeable lens to the asynchronous communication.

15 Claims, 16 Drawing Sheets

IMAGE PICKUP APPARATUS AND INTERCHANGEABLE LENS

CROSS-REFERENCE TO RELATED APPLICATIONS

This application is a Continuation of International Patent Application No. PCT/JP2010/067823, filed Oct. 12, 2010, which claims the benefit of International Patent Application No. PCT/JP2009/069867, filed Nov. 25, 2009, both of which are hereby incorporated by reference herein in their entirety.

TECHNICAL FIELD

The present invention relates to communication between an image pickup apparatus and an interchangeable lens attachable to the image pickup apparatus.

BACKGROUND ART

PTL 1 discloses the following technical idea as a method for communication between a camera that serves as an image pickup apparatus, and an interchangeable lens attachable to the camera. PTL 1 discloses a technique that performs synchronous serial communication at a first transmission rate, at which even an old-type interchangeable lens can make communication, and if the attached interchangeable lens is judged as a new lens with regard to the content of the communication, the communication is changed to synchronous serial communication at a second transmission rate that is higher than the first transmission rate. PTL 1 also describes that a circuit for a communication terminal is changed from open-drain type to CMOS type that is suitable for high-speed communication when the transmission rate is changed. This technique can provide a configuration that can operate in combination with an old-type interchangeable lens although the transmission rate is low, and that can operate in combination with a new-type interchangeable lens at a transmission rate that is increased by a certain level.

CITATION LIST

Patent Literature

PTL 1 Japanese Patent No. 3658084

To increase a communication amount for correction of optical characteristics and to increase a continuous-shooting speed, it is desirable to improve operating performances of an image pickup apparatus and an interchangeable lens.

Conventional synchronous serial communication has a waiting time for analyzing data received by the lens between communications and setting the data that is transmitted to the camera by the next communication, as well as for executing processing on the basis of the received data. The state during the waiting time is called Busy. The lens does not receive a communication from the camera during Busy. Owing to this, even though a clock speed is increased, a microcomputer in the camera makes a communication while the microcomputer waits for cancellation of Busy. The improvement for the operating performance is limited. Meanwhile, the camera frequently makes communication interruption against a microcomputer in the lens, and the lens has to preferentially perform communication interruption processing for outputting a Busy signal or for canceling the Busy state every time when the communication interruption occurs. This may disturb the improvement in operating performance.

The present invention of the subject application provides an image pickup apparatus available for communication with an interchangeable lens that can further improve an operating performance and available for communication with an old-type interchangeable lens using a conventional communication method while compatibility is maintained, and also provides an interchangeable lens.

SUMMARY OF INVENTION

To address the problem, an image pickup apparatus to which an interchangeable lens is attachable according to a technical idea of the subject application includes first and second terminals for communication with the interchangeable lens; and a communication controller for, when the communication is made with the attached interchangeable lens, in synchronous communication in which the first terminal outputs a clock signal, judging whether or not the attached interchangeable lens is available for asynchronous communication in which the first terminal does not output the clock signal, continuing the synchronous communication in which the first terminal outputs the clock signal if it is judged that the asynchronous communication is unavailable, and determining a transmission rate of the asynchronous communication in which the communication is made by using the first and second terminals without the clock signal if it is judged that the asynchronous communication is available.

Also, an interchangeable lens attachable to an image pickup apparatus includes first and second terminals for communication with the image pickup apparatus; and a communication controller for, when communication is made with the image pickup apparatus with the lens attached, in synchronous communication in which a clock signal is received by the first terminal, judging whether or not the image pickup apparatus with the lens attached is available for asynchronous communication in which the clock signal is not output to the first terminal, continuing the synchronous communication in which the clock signal is received by the first terminal if it is judged that the asynchronous communication is unavailable, and making the asynchronous communication in which the communication is made by using the first and second terminals without the clock signal if it is judged that the asynchronous communication is available.

Further features of the present invention will become apparent from the following description of exemplary embodiments with reference to the attached drawings.

DESCRIPTION OF EMBODIMENTS

Next, examples to which the technical idea of the subject application is applied will be described below in the form of embodiments.

First Embodiment

Circuit Configurations of Camera and Interchangeable Lens

Figure 1:
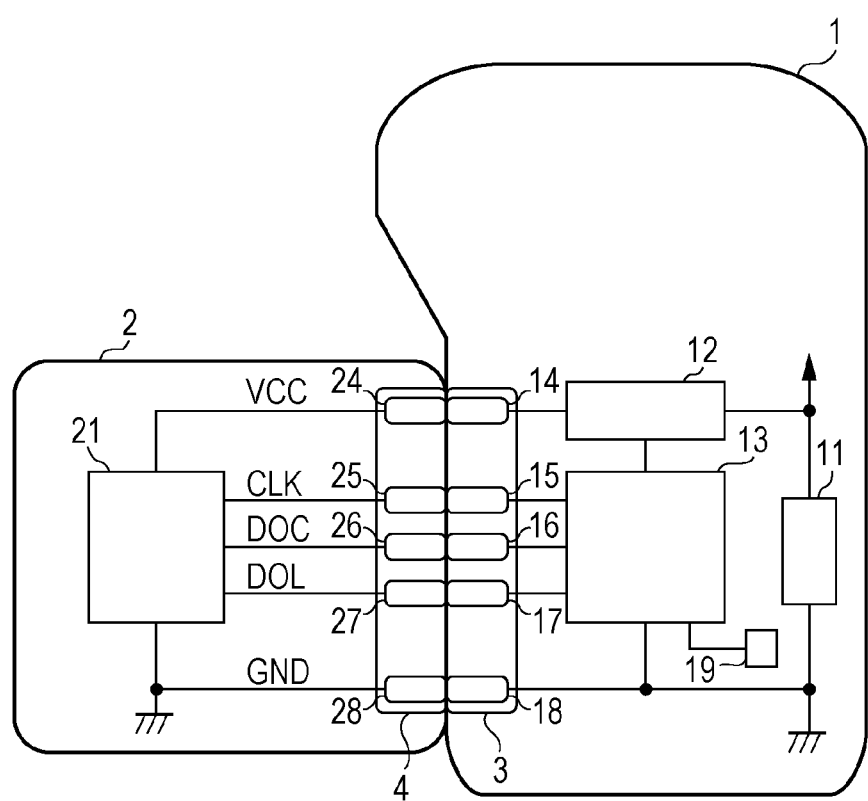
FIG. 1 is an illustration showing circuit configurations of a camera and an interchangeable lens.

FIG. 1 is an illustration showing circuit configurations of an interchangeable lens 2 and a camera 1 to which the interchangeable lens 2 can be attached, as implementations of the present invention. The interchangeable lens 2 may be an I-type lens and a II-type lens. The I-type lens is unavailable for asynchronous communication that can provide synchronization without the output of a CLK signal (described later), and the II-type lens is available for asynchronous communication. The camera 1 includes a mount portion 3, and the interchangeable lens 2 includes a lens mount portion 4.

The camera 1 includes a battery 11, a power generating unit 12, and a camera microcomputer 13. The power generating unit 12 receives a voltage that is output from the battery 11 and generates a supply voltage that is stabilized optimally for operating an electric circuit of the camera microcomputer 13 etc. The power generating unit 12 supplies the supply voltage to respective sections of the electric circuit. The camera 1 typically includes a photometric sensor for exposure control, and an AF sensor for auto focus control. Also, the camera 1 includes a circuit configuration having an image pickup device for capturing a digital image and a drive circuit of the device, an A/D conversion circuit, an image processing circuit, a liquid crystal monitor and a drive circuit of the monitor, a memory for recording the digital image, and a motor driver for driving mechanics. These components do not deeply involve in the subject of the technical idea of the subject application, and hence these components are not shown.

Contact portions 14 to 18 that are provided at the mount portion 3 in the camera and used for exchange of electric signals with the interchangeable lens will be described. A camera power terminal 14 supplies a lens power that is generated by the power generating unit 12 to the interchangeable lens. A camera CLK terminal 15 serves as a first terminal that transmits, for example, a synchronous clock signal when communication is made between the camera and the interchangeable lens. A camera DOC terminal 16 serves as a second terminal that transmits communication data from the camera to the interchangeable lens. A camera DOL terminal 17 serves as a second terminal that receives communication data from the interchangeable lens to the camera. In this embodiment, the DOC terminal and DOL terminal serving as the second terminals are illustrated as the separately provided DOC terminal 16 and DOL terminal 17 for serial communication. Alternatively, the DOC terminal and DOL terminal serving as the second terminals may serve as first terminals. These terminals 15 to 17 are connected to the camera microcomputer 13. Reference sign 18 denotes an earth terminal. A temperature sensor 19 outputs information relating to the temperature around the camera. The temperature output is connected to the camera microcomputer 13.

The interchangeable lens 2 includes a lens microcomputer 21, and contact portions 24 to 28 that are provided at the lens mount portion 4 and used for exchange of electric signals with the camera. A lens power terminal 24 receives power supply from the camera. A lens CLK terminal 25 transmits, for example, a synchronous clock signal when communication is made with the camera. A lens DOC terminal 26 receives communication data from the camera to the interchangeable lens. A lens DOL terminal 27 transmits communication data from the interchangeable lens to the camera. Reference sign 28 denotes a lens earth terminal.

When the interchangeable lens 2 is correctly attached to the camera 1, the camera terminals 14 to 18 are connected to the lens terminals 24 to 28 by one-to-one correspondence as illustrated.

The present invention may be applied even if wireless communication is made between a camera and a lens.

In this embodiment, the camera terminals 14 to 18 are provided at the mount portion 3. However, the camera CLK terminal 15 may be provided at a position other than the mount portion 3. Also, the lens terminals 24 to 28 are provided at the lens mount portion 4. However, the lens CLK terminal 25 may be provided at a position other than the lens mount portion 4.

In this embodiment, two types of interchangeable lenses 2 are used as described below. A lens of one type is an I-type lens that is available for synchronous communication but is unavailable for asynchronous communication with the camera. A lens of another type is a II-type lens that is available for synchronous communication and asynchronous communication with the camera. The synchronous communication is a method for exchanging data between a camera and an interchangeable lens on the basis of a synchronous clock signal transmitted through the CLK terminal 25 while synchronous transmission and reception are maintained. The asynchronous communication is a method for exchanging data between a camera and an interchangeable lens at a predetermined baud rate without using a synchronous clock signal transmitted through the CLK terminal 25.

Configuration Relating to Serial Communication Control

Figure 2:
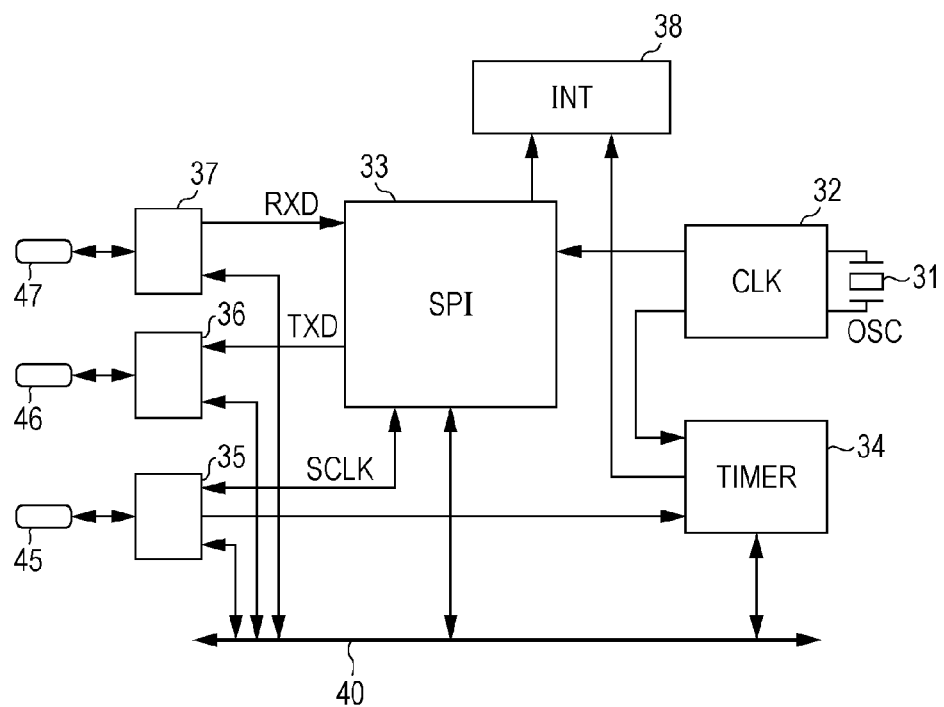
FIG. 2 is a circuit block diagram of a microcomputer.

FIG. 2 illustrates a configuration relating to serial communication control from among the circuit configuration included in the camera microcomputer 13 or the lens microcomputer 21. The camera microcomputer 13 and the lens microcomputer 21 are separately provided configurations; however, these microcomputers may have the same components to realize the configurations relating to the serial communication control. Hence, the microcomputers are described with reference to the common drawing.

In many cases, an oscillator 31 is a quartz oscillator or a ceramic oscillator. Such an oscillator is frequently an external device rather than being arranged in the microcomputer. A clock generating circuit 32 is an oscillator circuit that is connected to the oscillator 31 and generates an oscillating clock. The oscillator circuit 32 includes a multiplier circuit that converts an oscillating clock into a clock with a higher frequency, and a clock generating circuit that divides and combines the clock with the high frequency converted by the multiplier circuit and generates clocks with various frequencies. Reference sign 33 is a communication control circuit, which will be described in detail with reference to FIG. 3. A counter/timer circuit 34 can count the number of pulses of an input signal, and measure the time width of the input signal. A clock signal generated by the clock generating circuit 32 is supplied to the communication control circuit 33 and the counter/timer circuit 34. I/O control circuits 35 to 37 will be described. The I/O control circuits 35 to 37 are circuits that change the data input/output direction and input/output signal type of input/output signals, and the input/output circuit form of the input/output terminals 45 to 47. Changing the data input/output direction is selecting whether the terminal is used for data input or data output. Changing the input/output signal type is selecting whether or not an input/output signal of a general-purpose parallel I/O signal or an input/output signal with the communication control circuit 33 is connected to the terminal. Changing the input/output circuit form is selecting whether the output is performed by the open-drain method or the CMOS method described in PTL 1, and selecting whether or not a pull-up resistor is connected. The I/O control circuit 35 selects the input or output of the input/output terminal 45. A synchronous clock signal SCLK is connected from the communication control circuit 33 to the I/O control circuit 35. The I/O control circuit 35 can supply the SCLK signal to the counter/timer circuit 34. The I/O control circuit 36 selects the input or output of the input/output terminal 46. A serial communication data output signal TXD is connected from the communication control circuit 33 to the I/O control circuit 36. The I/O control circuit 37 selects the input or output of the input/output terminal 47. A serial communication data input signal RXD is connected from the communication control circuit 33 to the I/O control circuit 37.

A reference sign 38 is an interruption control circuit. Interruption generation signals are connected to the interruption control circuit 38 from the communication control circuit 33 and the counter/timer circuit 34. A data bus 40 is provided in the microcomputer. The above-described communication control circuit 33, counter/timer circuit 34, and I/O control circuits 35 to 37 are connected to the data bus 40 and can transmit and receive data required for the operations. The microcomputer includes circuit configurations having an ALU, a program counter, a ROM, a RAM, an A/D converter in addition to the illustrated configurations; however, such circuit configurations are not shown.

In the case of the camera microcomputer, the input/output terminal 45 is connected to the CLK terminal 15 in FIG. 1, the input/output terminal 46 is connected to the DOC terminal 16 in FIG. 1, and the input/output terminal 47 is connected to the DOL terminal 17 in FIG. 1.

In the case of the lens microcomputer, the input/output terminal 45 is connected to the lens CLK terminal 25 in FIG. 1, the input/output terminal 46 is connected to the lens DOL terminal 27 in FIG. 1, and the input/output terminal 47 is connected to the lens DOC terminal 26 in FIG. 1. This is because the DOC signal corresponds to transmission data from the camera to the lens, and the DOL signal corresponds to transmission data from the lens to the camera.

Further Detailed Configuration of Communication Control Circuit 33

Figure 3:
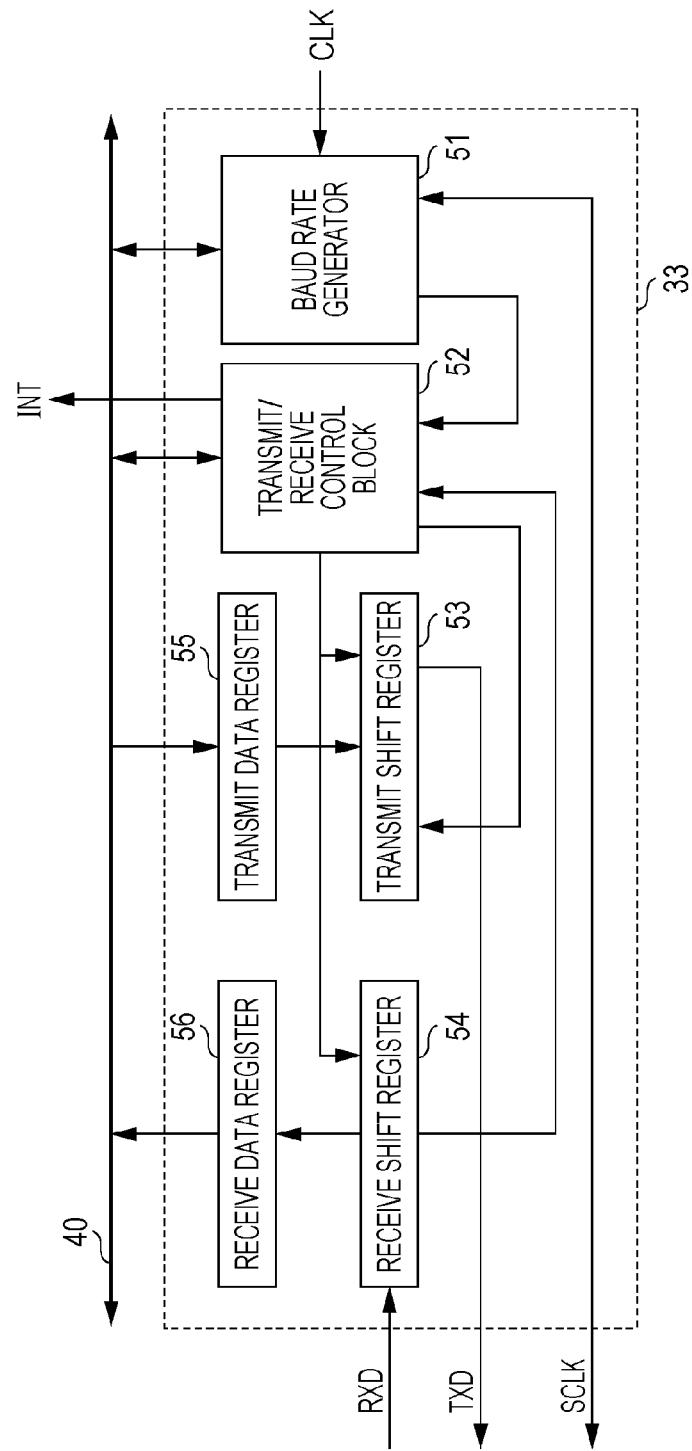
FIG. 3 is a block diagram of a communication control circuit.

FIG. 3 is an illustration for explaining a further detailed configuration of the communication control circuit 33 shown in FIG. 2. The clock signals with various frequencies generated by the clock generating circuit 32 are input to a baud rate generator 51. The baud rate generator 51 generates clock signals required for communication control in accordance with various communication setting data transmitted through the data bus 40. The communication setting data includes selecting whether the communication is a master or a slave, selecting whether the communication is synchronous communication or asynchronous communication, frequency setting for a synchronous clock in the case of the synchronous communication, and frequency setting for an asynchronous sampling clock in the case of the asynchronous communication. If the synchronous communication and the communication master are set by the communication setting data, a synchronous clock signal SCLK corresponding to a frequency setting value for a synchronous clock in the case of the synchronous communication is output. If the synchronous communication and the communication slave are set by the communication setting data, a synchronous clock signal SCLK is input. The synchronous clock signal SCLK is also supplied to a transmit/receive control block 52. If the asynchronous communication is set by the communication setting data, a sampling clock corresponding to a frequency setting value for an asynchronous sampling clock in the case of the asynchronous communication is supplied to the transmit/receive control block 52. The transmit/receive control block 52 supplies a shift clock to a transmit shift register 53 and a receive shift register 54 (described later) in accordance with the various communication setting data transmit through the data bus 40, and performs timing control for serial communication by inputting and outputting a trigger signal for transmission and reception. Also, the transmit/receive control block 52 generates an interruption signal at the timing when the transmission and reception of the serial communication are completed.

A transfer shift register 53 inputs data that is transmitted through the serial communication as a parallel input, and outputs a signal TXD as a serial output. The transmit/receive control block 52 supplies a shift clock for the serial output. If the asynchronous communication is made, a transmit trigger signal is input from the transmit/receive control block 52. The receive shift register 54 inputs a data signal RXD that is received through the serial communication, as a serial input, and outputs a signal as a parallel output. The transmit/receive control block 52 supplies a shift clock for the serial input. If the asynchronous communication is made, a receive trigger signal is output to the transmit/receive control block 52. A transmit data register 55 inputs transmission data from the data bus 40 and sets data in the transmit shift register 53. A receive data register 56 inputs reception data from the receive shift register 54 and can output data to the data bus 40.

Protocol of Synchronous Communication

Figure 4:
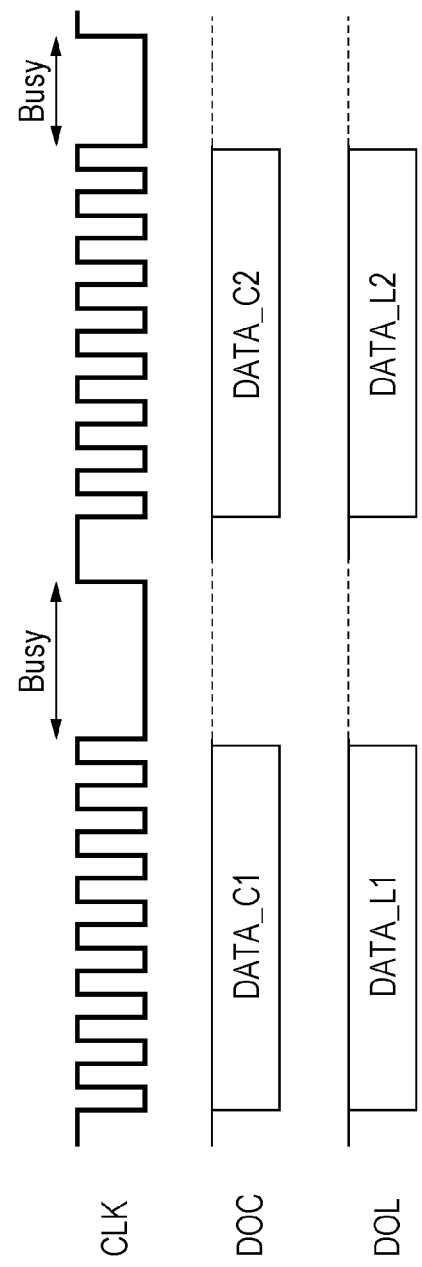
FIG. 4 is a timing chart of communication signals between the camera and the interchangeable lens.

FIG. 4 is a protocol example between the camera and the interchangeable lens during synchronous communication. A signal CLK is a synchronous clock for synchronous communication. In this example, the camera serves as the master for the communication between the camera and the interchangeable lens. A signal DOC is communication data that is output from the camera and input to the lens. A signal DOL is communication data that is output from the lens and input to the camera.

In this example, the data of the signals DOC and DOL is changed in synchronization with a falling edge of the synchronous clock CLK on an 8-bit basis as the unit of a single transmission, and the data of DOL is latched in the camera and the data of DOC is latched in the lens at a rising edge of the synchronous clock CLK. The levels of the signals DOC and DOL are changed in synchronization with the falling edge of the synchronous clock CLK in accordance with bit values of data to be transmitted. Hence, the detail of how the levels are changed is not described.

The synchronous communication in which data is synchronized with the clock signal allows many pieces of information to be exchanged even if the number of contacts is small. In particular, with use of a relatively inexpensive microcomputer, data can be reliably exchanged even if an operation clock has an error in accuracy.

Control Flow of Camera Microcomputer 13

Figure 5:
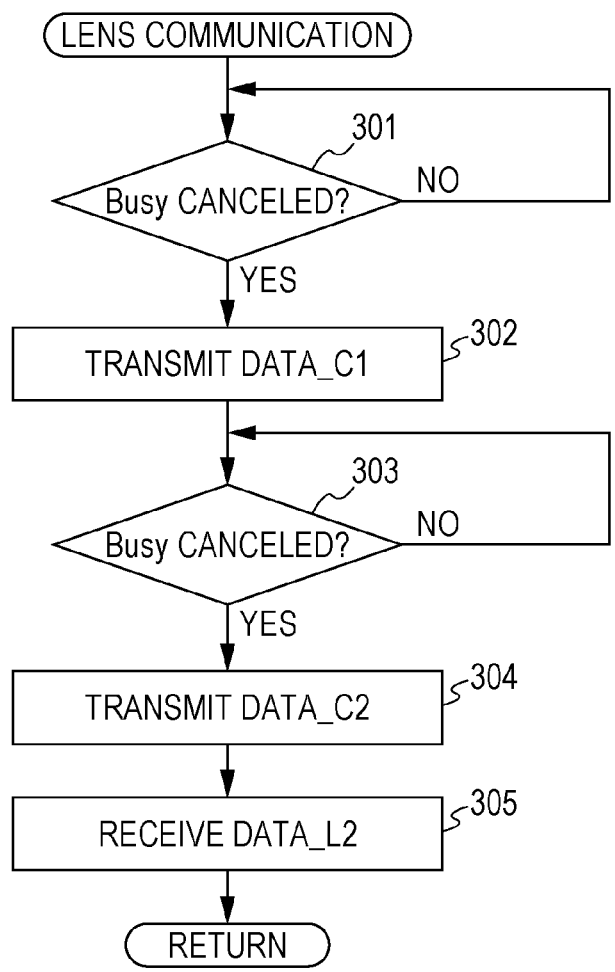
FIG. 5 is an operation flowchart of a camera microcomputer.

A control flow when the camera microcomputer 13 makes communication with the interchangeable lens in accordance with the communication protocol in FIG. 4 will be described with reference to FIG. 5.

The input level of the terminal that outputs the synchronous clock signal CLK is checked, and it is judged whether a Busy state of the lens is canceled or not (step 301). In this embodiment, it is assumed that the state is in the Busy state if the lens sets the terminal at L level. In this state, the camera cannot make communication with the lens even for the synchronous clock CLK. The Busy state is a communication-standby unavailable state. If the input level of the terminal that outputs the signal CLK is at H level and hence the lens is not in the Busy state, the process goes to step 302.

In step 302, data DATA_C1 that is transmitted to the lens is set in the serial data transmit shift register, and serial communication is made by a single-transmission basis. The data DATA_C1 that is transmitted to the lens is a certain command for the lens, and reply data from the lens in response to the command is data DATA_L2 through next communication by a single-transmission basis. Data DATA_L1 that is transmitted from the lens to the camera at this time is unrelated (don't care) data that does not correspond to the command from the camera. Hence, the data DATA_L1 is not read or processed.

The input level of the terminal that outputs the synchronous clock signal CLK is checked, and it is judged whether the Busy state of the lens is canceled or not (step 303). The interchangeable lens sets the terminal that outputs the synchronous signal CLK at L level while the content of the transmitted data DATA_C1 is analyzed in the lens and processing is applied thereto in correspondence with the analysis. As the result, the synchronous signal CLK is brought into the Busy state. The process waits until the processing is completed and the interchangeable lens sets the terminal that outputs the synchronous signal CLK at H level. That is, the process goes to step 304 after the interchangeable lens is no longer in the Busy state.

Next, data DATA_C2 that is transmitted to the interchangeable lens is set in the serial data transmit shift register, and serial communication is made by a single-transmission basis (step 304). If the data DATA_C1 transmitted in step 302 is a command for transmitting lens-specific information to the camera, the content of the data DATA_C2 is unrelated data. In this case, the data DATA_L2 transmitted from the lens contains reply information to the data DATA_C1. The data DATA_L2 transmitted to the receive shift register is acquired (step 305).

The above-described flow is a basic operation flow of the camera microcomputer when communication is made with the interchangeable lens.

Control Flow of Lens Microcomputer 21

Figure 6:
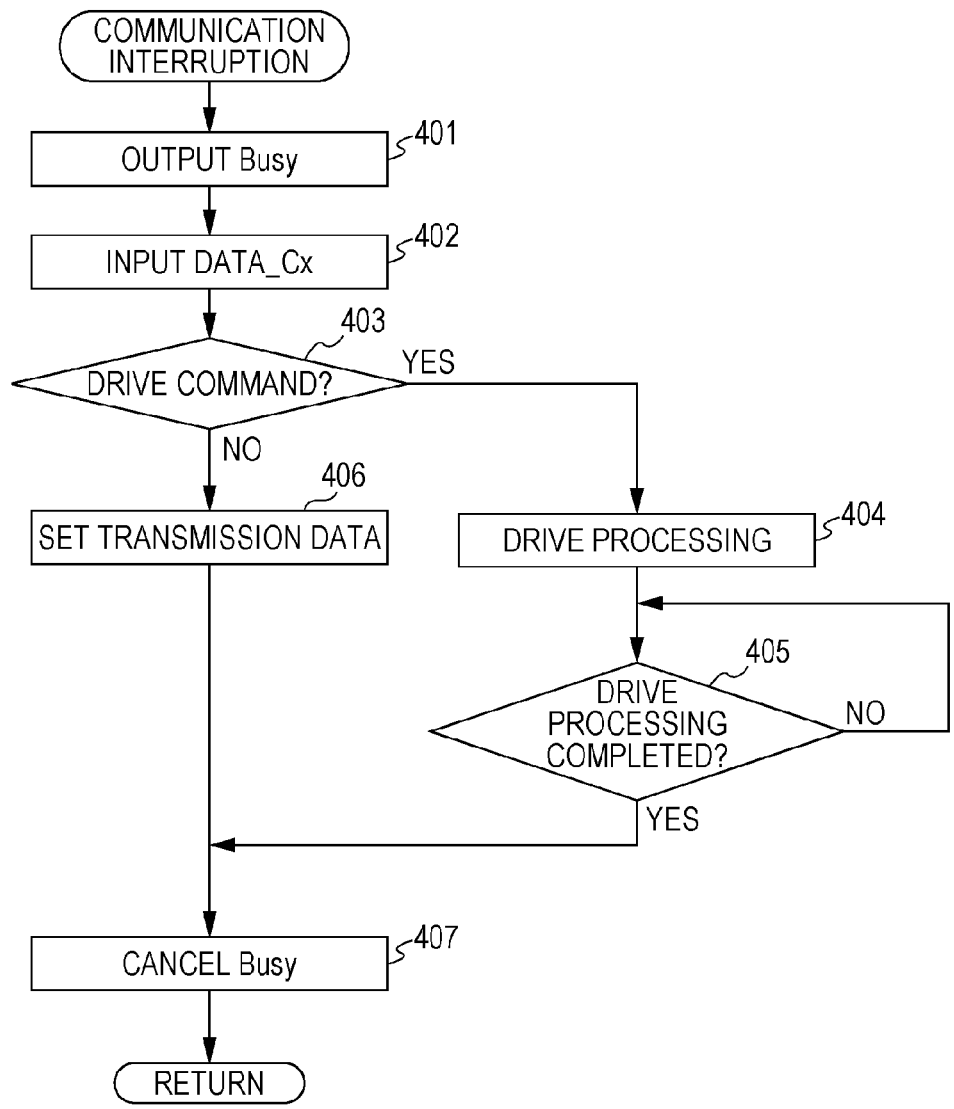
FIG. 6 is an operation flowchart of a lens microcomputer.

Next, a control flow when the interchangeable lens microcomputer 21 makes communication with the camera in accordance with the communication protocol in FIG. 4 will be described with reference to FIG. 6.

The interchangeable lens microcomputer 21 serves as the slave during communication. Thus, the reception of serial communication by a single-transmission basis from the camera is detected by a communication interruption function that generates an interruption signal when rising edges of the synchronous clock signal CLK are counted by a predetermined number.

First, the terminal that receives the synchronous clock signal CLK is set at L level, so that the camera can judge that the lens is in the Busy state (step 401).

The transmission data DATA_C1 that is transmitted from the camera and input to the receive shift register is input, and the content of the data is analyzed. Although the transmission data from the camera is DATA_C1, the data is named as DATA_Cx in the flowchart because DATA_C2 etc. may be transmitted in the subsequent process (step 402).

In step 403, if the content of the transmission data DATA_C1 from the camera is a drive command for an actuator in the interchangeable lens, the process goes to step 404.

In step 404, drive processing is performed for the actuator in the interchangeable lens in accordance with the content of the transmission data DATA_C1 from the camera. It is judged whether or not the processing relating to driving of the actuator in the lens is ended and the lens can receive next communication from the camera (step 405). If the lens can receive next communication, the process goes to step 407.

If the content of the transmission data DATA_C1 from the camera is a data transmit request specific to the interchangeable lens in step 403, the process goes to step 406. In step 406, lens-specific data that is requested on the basis of the transmission data DATA_C1 from the camera is set in the transmit shift register.

In step 407, the terminal that receives the synchronous clock signal CLK is set at H level, so that the camera can judge that the lens is not in the Busy state.

The data amount to be handled for communication to perform highly accurate exposure control and auto focus control need multiple units of transmissions. Also, information has to be successively updated every time when the zooming position and the range ring position of the interchangeable lens are changed. Hence, the camera has to frequently make such communication. The camera microcomputer makes communication while the microcomputer frequently waits for the cancellation of the Busy state of the lens. Owing to this, even if the frequency of the synchronous clock signal CLK is increased, the operating performance may be improved less than expected. The camera frequently makes communication interruption against the lens microcomputer, and the lens has to preferentially perform communication interruption processing for outputting a Busy signal or canceling the Busy state every time when the communication interruption occurs. This may disturb the improvement for the operating performance.

Communication Setting Operation of Camera System

Figure 7:
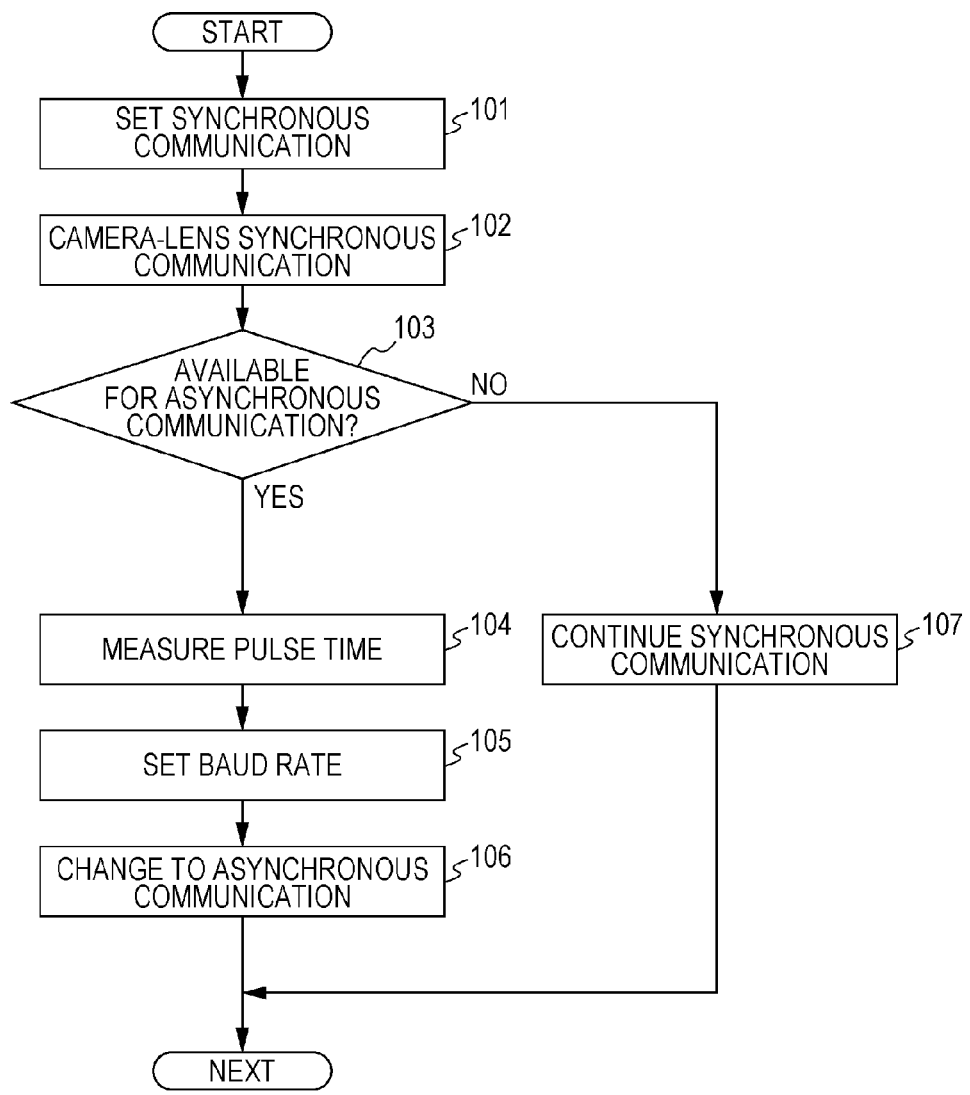
FIG. 7 is a camera system operation flowchart of the camera and the interchangeable lens.

FIG. 7 is a setting operation flowchart relating to communication of the camera system including the camera and the interchangeable lens that are implementations of the present invention. It is to be noted that individual operation flows for the microcomputers in the camera and the interchangeable lens will be described later. FIG. 7 will be described as a general operation flow.

When a power switch (not shown) is turned on and the camera and the interchangeable lens become operable, the operation in the flowchart is started.

The camera microcomputer 13 performs setting for the communication control circuit 33 and the I/O control circuits 35 to 37 through synchronous communication, as initial setting for the communication method with the interchangeable lens (step 101). This is because the camera is available for the I-type lens and II-type lens. With this setting, the camera microcomputer 13 serves as the communication master during communication. In the camera microcomputer 13, the input/output terminal 45 outputs the communication synchronous clock SCLK. Also, with this setting, in the camera microcomputer 13, the transmission data TXD signal from the camera to the interchangeable lens is output from the input/output terminal 46, and the transmission data RXD signal from the interchangeable lens to the camera is input from the input/output terminal 47.

Even in the case of the II-type lens available for asynchronous communication, the interchangeable lens performs the slave setting during of synchronous communication for the communication control circuit 33 and the I/O control circuits 35 to 37 as initial setting. With this setting, in the lens microcomputer 21, the communication synchronous clock SCLK signal is input from the input/output terminal 45. Also, with this setting, in the lens microcomputer 21, the transmission data TXD signal from the interchangeable lens to the camera is output from the input/output terminal 46, and the transmission data RXD signal from the camera to the interchangeable lens is input from the input/output terminal 47.

Communication by the synchronization method is made between the camera and the interchangeable lens (step 102). A timing chart for synchronous communication, and operation flows for the camera microcomputer 13 and lens microcomputer 21 will be described later with reference to FIGS. 10 to 12.

In this communication, a lens information transmit command is transmitted from the camera by way of DATA_C1. The lens information transmit command is a command that instructs the interchangeable lens to transmit the type and name of the interchangeable lens, or information indicative of whether the interchangeable lens is the I-type lens unavailable for asynchronous communication or the II-type lens available for asynchronous communication, to the camera.

When the interchangeable lens receives the lens information transmit command, the interchangeable lens transmits lens information corresponding to the command to the camera by way of DATA_L2.

The camera microcomputer 13 analyzes the received lens information DATA_L2, and judges whether the attached interchangeable lens is the I-type lens unavailable for asynchronous communication or the II-type lens available for asynchronous communication (step 103). If the camera microcomputer 13 judges that the attached interchangeable lens is the II-type lens, the process goes to step 104.

The camera makes communication by the synchronization method with the interchangeable lens, and transmits a command for pulse output of measurement for baud rate adjustment when asynchronous communication is made (step 104). The detail of the baud rate adjustment will be described later. In asynchronous communication, data communication is made without using the synchronous clock signal that is transmitted by the CLK terminal 25. Hence, the baud rate adjustment is conducted for adjusting the transmission rate of data.

If the lens receives this command, the lens performs pulse output for the baud rate adjustment when asynchronous communication is made, to allow the camera to perform the measurement. A timing chart of the pulse output for the baud rate adjustment to set the transmission rate will be described later with reference to FIG. 9.

In step 105, the camera microcomputer 13 adjusts the baud rate for the asynchronous communication by taking into account a relative shift in accuracy of an oscillation frequency of the lens microcomputer 21 on the basis of a count value of a baud rate adjustment pulse Tmes that is obtained in step 104.

In step 106, the camera microcomputer 13 changes setting for the communication method with the interchangeable lens, and performs setting for the communication control circuit 33 and the I/O control circuits 35 to 37 to make asynchronous communication.

The lens microcomputer 21 changes setting for the communication method with the camera, and performs setting for the communication control circuit 33 and the I/O control circuits 35 to 37 to make asynchronous communication. After this step is executed, the communication between the camera and the interchangeable lens becomes asynchronous communication.

If the attached interchangeable lens is the I-type lens unavailable for asynchronous communication, the process goes to step 107 from step 103, and the synchronous communication is continued.

Example of Communication Timing Chart in Asynchronous Communication

Figure 8:
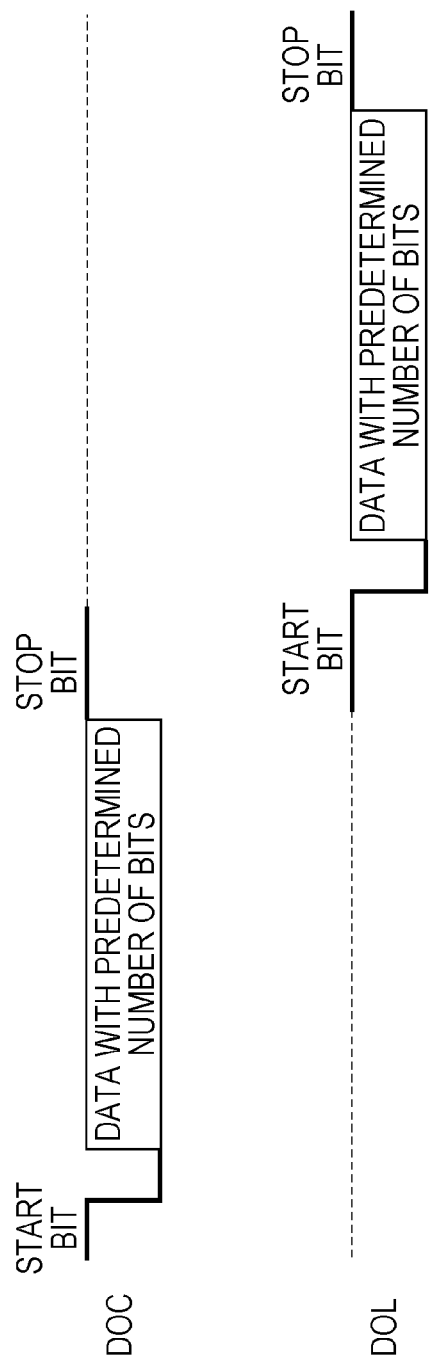
FIG. 8 is a timing chart of communication signals between the camera and the interchangeable lens.

FIG. 8 is an example of a communication timing chart in asynchronous communication. If the lens information transmit request command or the drive command for the actuator in the lens is transmitted from the camera to the lens, an asynchronous data pattern with the baud rate set in the DOC signal is output. First, a start bit at L level is output, and then data with a predetermined number of bits is output with the set baud rate. If the output of the data with the predetermined number of bits is ended, a stop bit at H level is output, and the transmission is completed. The CLK signal does not have to be output, and the DOL signal does not have to be received simultaneously.

If the lens transmits the lens information to the camera in response to the command transmitted from the camera, the lens outputs the lens information to the DOL signal at the timing when the lens becomes ready for the data transmission without using the CLK signal. The communication protocol is similar to that of the DOC signal.

By changing the communication to the asynchronous communication method, the cancellation of the Busy state does not have to be checked. Otherwise the check is performed between the camera microcomputer 13 and the lens microcomputer 21 on a single-transmission basis.

It is to be noted that the terminal that is used for transmitting the drive command from the camera to the lens during the asynchronous communication is not limited to the DOC terminal, and may be changed to the CLK terminal. In this case, the circuits have to be changed such that the I/O control circuit 35 in the camera is connected to the transmit shift register 53 and the I/O control circuit 35 in the lens is connected to the receive shift register 54.

Now, the description for the setting operation flow relating to the communication of the camera system including the camera and the interchangeable lens is ended.

Timing Chart for Setting Communication Speed

It is assumed that the predetermined baud rate for the asynchronous communication is 19200 bps as an example of the baud rate setting (or adjustment) in step 105 (described above). If the oscillator circuit of the lens microcomputer 21 has an oscillation frequency of 10 MHz without a shift, the lens microcomputer 21 can transmit and receive asynchronous communication data with a baud rate at 19200 bps. However, if the lens microcomputer 21 is oscillated at 10.1 MHz due to an error of a circuit element, the baud rate may become 19392 bps because the value contains the frequency drift although the baud rate is expected to be 19200 bps. In the case of the asynchronous communication, the synchronous clock is not present. Hence, if the shift between the baud rates is not within a predetermined range, a sampling error may occur and data cannot be correctly transmitted or received. Therefore, the camera microcomputer 13 performs the baud rate setting as setting for the transmission rate corresponding to the relative shift in accuracy of the oscillation frequency of the lens microcomputer 21.

Figure 9:
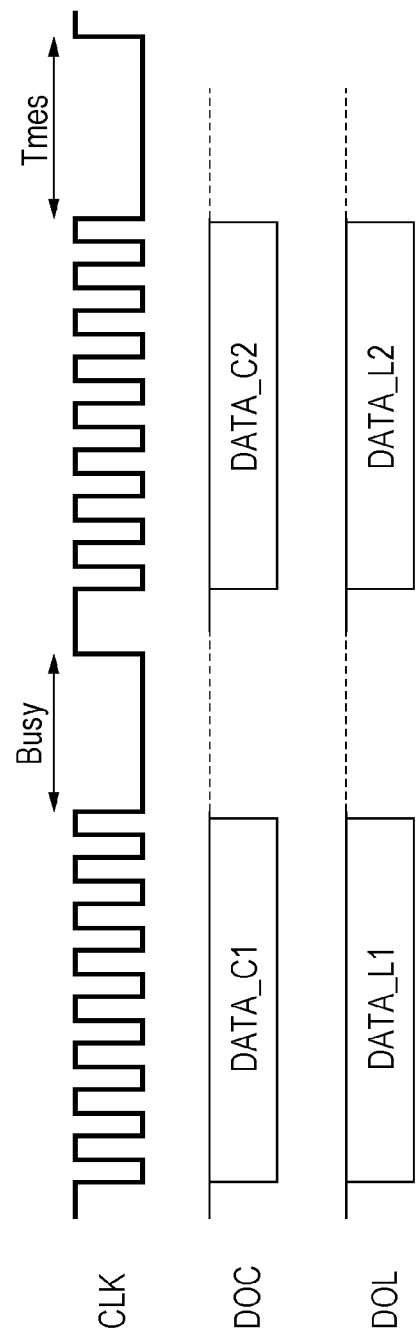
FIG. 9 is a timing chart of communication signals between the camera and the interchangeable lens.

FIG. 9 shows an example of a timing chart relating to the output of the baud rate adjustment pulse. The camera microcomputer 13 transmits a command that requests the output of the baud rate adjustment pulse to the interchangeable lens by way of the camera transmission data DATA_C1 shown in FIG. 9. Then, the lens microcomputer 21 changes the Busy output to L output while the lens microcomputer 21 receives the data and analyzes the command. When the lens microcomputer 21 completes the command analysis and gets ready for reception of the next communication, the lens microcomputer 21 sets the CLK signal at H level to cancel the Busy state, and notifies the camera about the cancellation of the Busy state.

When the camera microcomputer 13 recognizes that the CLK signal becomes H level and hence the Busy state of the lens is canceled, the camera microcomputer 13 transmits transmission data DATA_C2. The transmission data DATA_C2 at this time is unrelated data. This data is transmitted merely as a timing trigger for outputting the baud rate adjustment pulse to the lens.

If the lens microcomputer 21 receives the transmission data DATA_C2 and the communication interruption occurs, the lens microcomputer 21 immediately changes the CLK signal to L output so as to output the baud rate adjustment pulse Tmes. The baud rate adjustment pulse Tmes that is a pulse for adjusting the transmission rate is output for a time corresponding to a predetermined clock count of an operation clock generated by the oscillator circuit 32 of the lens microcomputer 21. For example, if the operation clock generated by the oscillator circuit 32 of the lens microcomputer 21 is 10 MHz and outputs 65536 clocks, pulse output with a time width of 6.5536 msec is provided as the baud rate adjustment pulse Tmes. If the operation clock generated by the oscillator circuit 32 of the lens microcomputer 21 is 10.1 MHz due to an error of a circuit element, the time width of the baud rate adjustment pulse Tmes becomes 6.4887 msec. The difference between the time width of 6.5536 msec and the time width 6.4887 msec reflects the shift in accuracy of the oscillation frequency of the oscillator circuit in the lens microcomputer 21.

After the camera microcomputer 13 transmits the transmission data DATA_C2, the falling edge of the input/output terminal 45 is started and the rising edge of the terminal is ended, and performs time measurement by using the counter/timer circuit 34 for the time measurement of the baud rate adjustment pulse Tmes.

If the camera microcomputer 13 performs the time measurement by using the counter/timer circuit 34 with a clock of 16 MHz, the time 6.5536 msec corresponds to 104857 counts, and the time 6.4887 msec corresponds to 103819 counts. Also, in the camera microcomputer 13 performs the time measurement by using the counter/timer circuit 34 with a clock of 16.16 MHz, the time 6.5536 msec corresponds to 105906 counts, and the time 6.4887 msec corresponds to 104857 counts. With the time measurement for the baud rate adjustment pulse Tmes, the camera microcomputer 13 can recognize a relative shift in accuracy of the oscillation frequency of the lens microcomputer 21 with respect to the accuracy of the oscillation frequency of the camera microcomputer 13.

The camera microcomputer 13 sets the transmission rate on the basis of the shift in accuracy.

Communication Setting Operation Flow of Camera Microcomputer 13

Next, an operation flow relating to communication setting of the camera microcomputer 13 with respect to the interchangeable lens will be described with reference to flowcharts started from FIG. 10.

When a power switch (not shown) is turned on, and hence the camera microcomputer 13 starts its operation and makes communication with the interchangeable lens, the camera microcomputer 13 executes the following operation flow.

When the power switch is turned on, the communication control circuit 33 and the I/O control circuits 35 to 37 are set to make synchronous communication. Hence, the input level of the terminal that outputs the synchronous clock signal CLK is checked, and it is judged whether the Busy state of the lens is canceled or not (step 111), the process which is performed when synchronous communication is made. If the terminal that outputs the signal CLK is at H level and hence the lens is not in the Busy state, the process goes to step 112.

In step 112, data DATA_C1 that is transmitted to the interchangeable lens is set in the transmit shift register and the synchronous communication is made. The content of DATA_C1 is a lens information transmit command indicative of the type and name of the interchangeable lens or whether or not the lens is the II-type lens available for asynchronous communication.

In step 113, the input level of the terminal that outputs the synchronous clock signal CLK is checked, and it is judged whether the Busy state of the lens is canceled or not. The interchangeable lens sets the terminal that outputs the synchronous signal CLK at L level while the lens analyzes the content of the transmitted data DATA_C1 and performs processing in correspondence with the analysis. The state becomes the Busy state. The process waits for the completion of the processing and hence the Busy state is canceled, and then goes to step 114. In step 114, unrelated data DATA_C2 is set in the transmit shift register and performs synchronous communication. Then, in step 115, DATA_L2 that is lens information transmitted from the interchangeable lens when DATA_C2 is transmitted in the previous step is input from the receive shift register.

Then, the lens information input in the previous step is analyzed, and it is judged whether or not the currently attached interchangeable lens is available for asynchronous communication (step 116). If the camera microcomputer 13 judges that the currently attached interchangeable lens is the II-type lens that is available for asynchronous communication, the process goes to step 151 in FIG. 11.

In step 151, the camera microcomputer 13 checks the input level of the terminal that outputs the synchronous clock signal CLK and judges whether the Busy state of the lens is canceled or not. If the terminal that outputs the signal CLK is at H level and hence the lens is not in the Busy state, the process goes to step 152.

In step 152, the data DATA_C1 that is transmitted to the interchangeable lens is set in the transmit shift register and synchronous communication is made. The content of DATA_C1 is a command that requests the interchangeable lens to output a pulse of measurement for the baud rate adjustment when asynchronous communication is made.

The input level of the terminal that outputs the synchronous clock signal CLK is checked, and it is judged whether the Busy state of the lens is canceled or not (step 153). If the terminal that outputs the signal CLK is at H level and hence the lens is not in the Busy state, the process goes to step 154. In step 154, unrelated data DATA_C2 is set in the transmit shift register and performs synchronous communication.

Then, as described in step 104 in FIG. 7, the interchangeable lens sets the CLK signal at L output immediately after the reception of the data DATA_C2, so that the baud rate adjustment pulse Tmes is output (step 155). When the baud rate adjustment pulse Tmes is output, the time measurement by the counter/timer circuit 34 is started.

When the interchangeable lens sets the CLK signal at H output and hence the output of the baud rate adjustment pulse Tmes is ended, the time measurement by the counter/timer circuit 34 is ended (step 156). The measurement value by the counter/timer circuit 34 is input to the camera microcomputer 13. The camera microcomputer 13 recognizes the measurement value as information relating to a relative shift in accuracy of the oscillation frequency of the lens microcomputer 21 with respect to the accuracy of the oscillation frequency of the camera microcomputer 13. A baud rate when asynchronous communication is made is determined in accordance with the shift of the measurement value by the counter/timer circuit 34 with respect to an ideal value (step 157). The camera microcomputer 13 changes setting for the communication method with the interchangeable lens, and performs setting for the communication control circuit 33 and the I/O control circuits 35 to 37 to make asynchronous communication (step 158). Accordingly, the baud rate determined in step 157 is set in the communication control circuit 33. In the subsequent process, the communication with the interchangeable lens is made by the asynchronous communication method as described with reference to FIG. 8.

Figure 10:
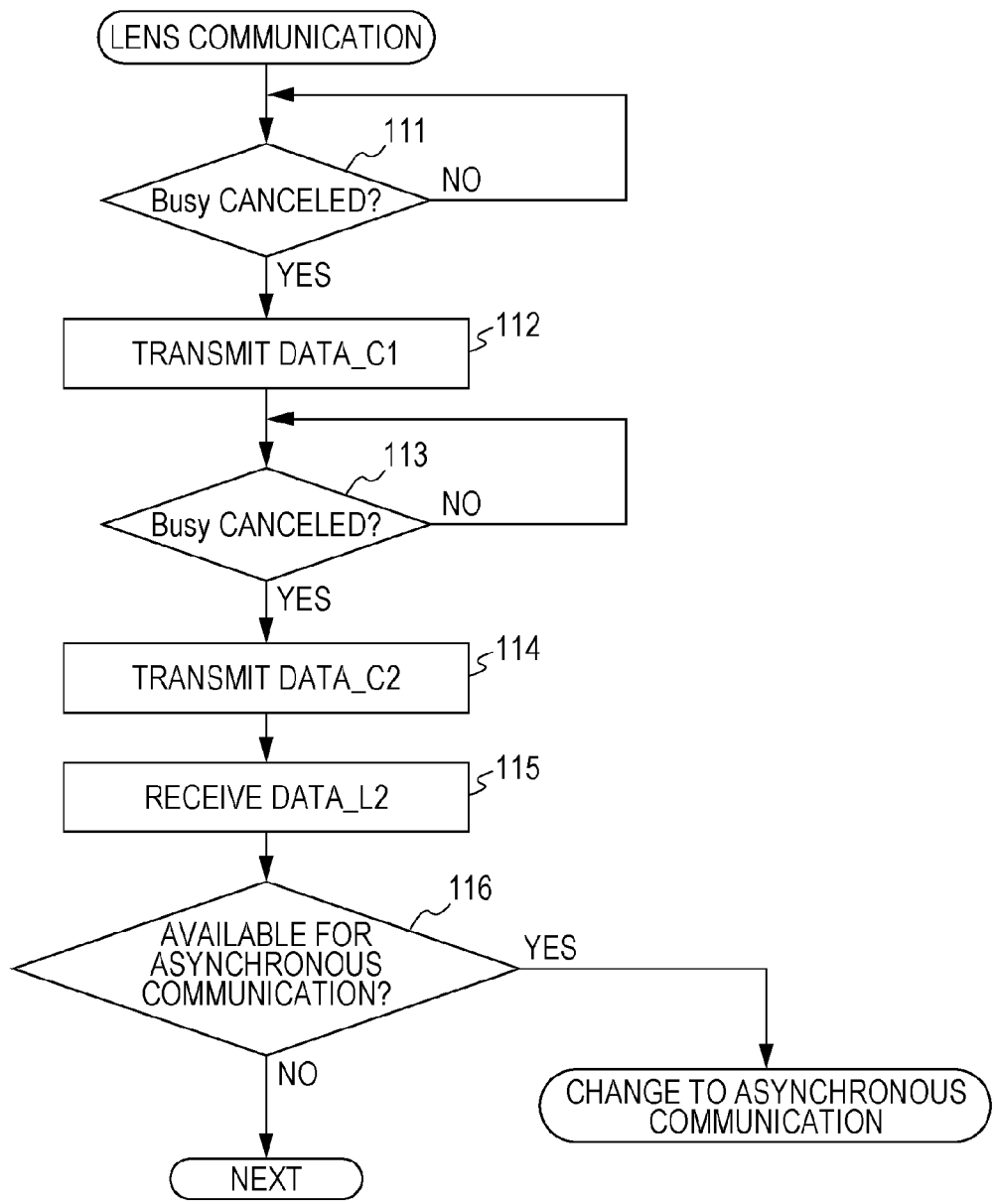
FIG. 10 is an operation flowchart of the camera microcomputer.
Figure 11:
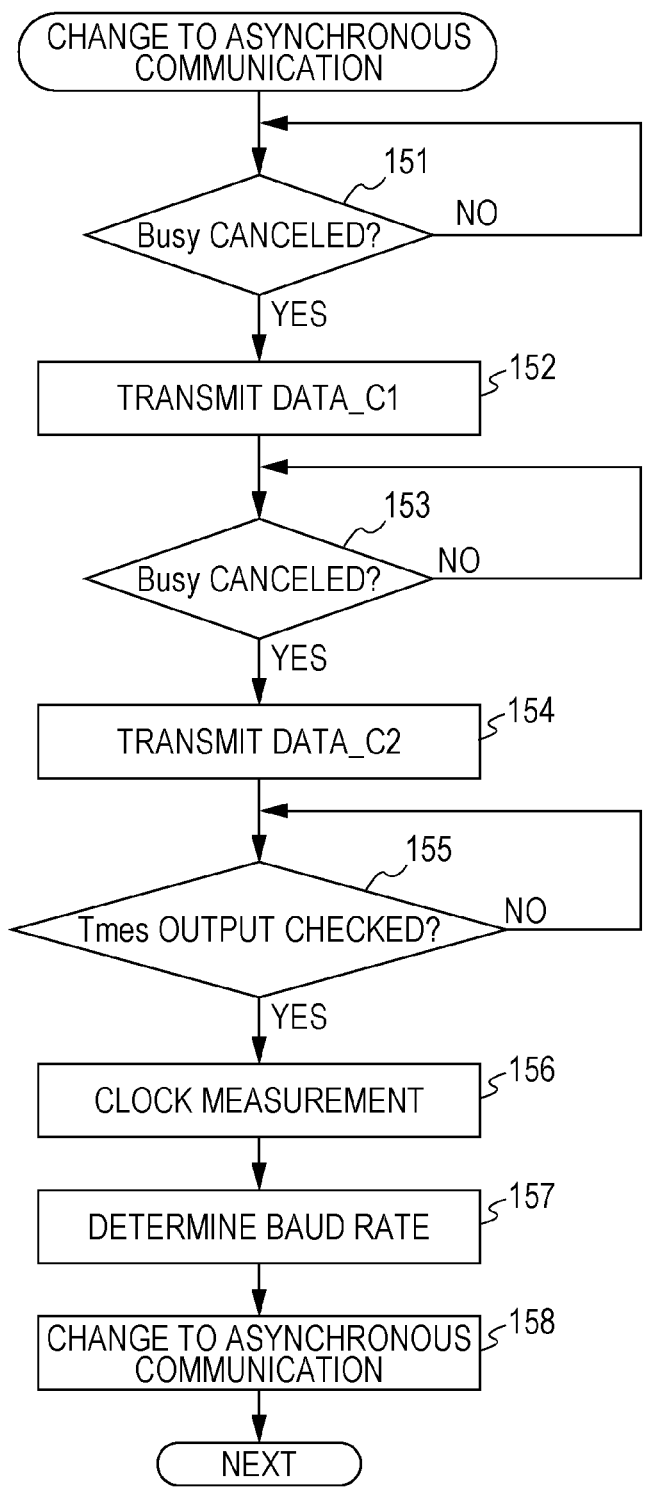
FIG. 11 is an operation flowchart of the camera microcomputer.

If it is judged that the interchangeable lens is the I-type lens unavailable for asynchronous communication in step 116 in FIG. 10, the steps described with reference to FIG. 11 are not executed, and the communication is continued with the interchangeable lens by synchronous communication method.

Information Communication Operation Flow of Lens Microcomputer 21

Figure 12:
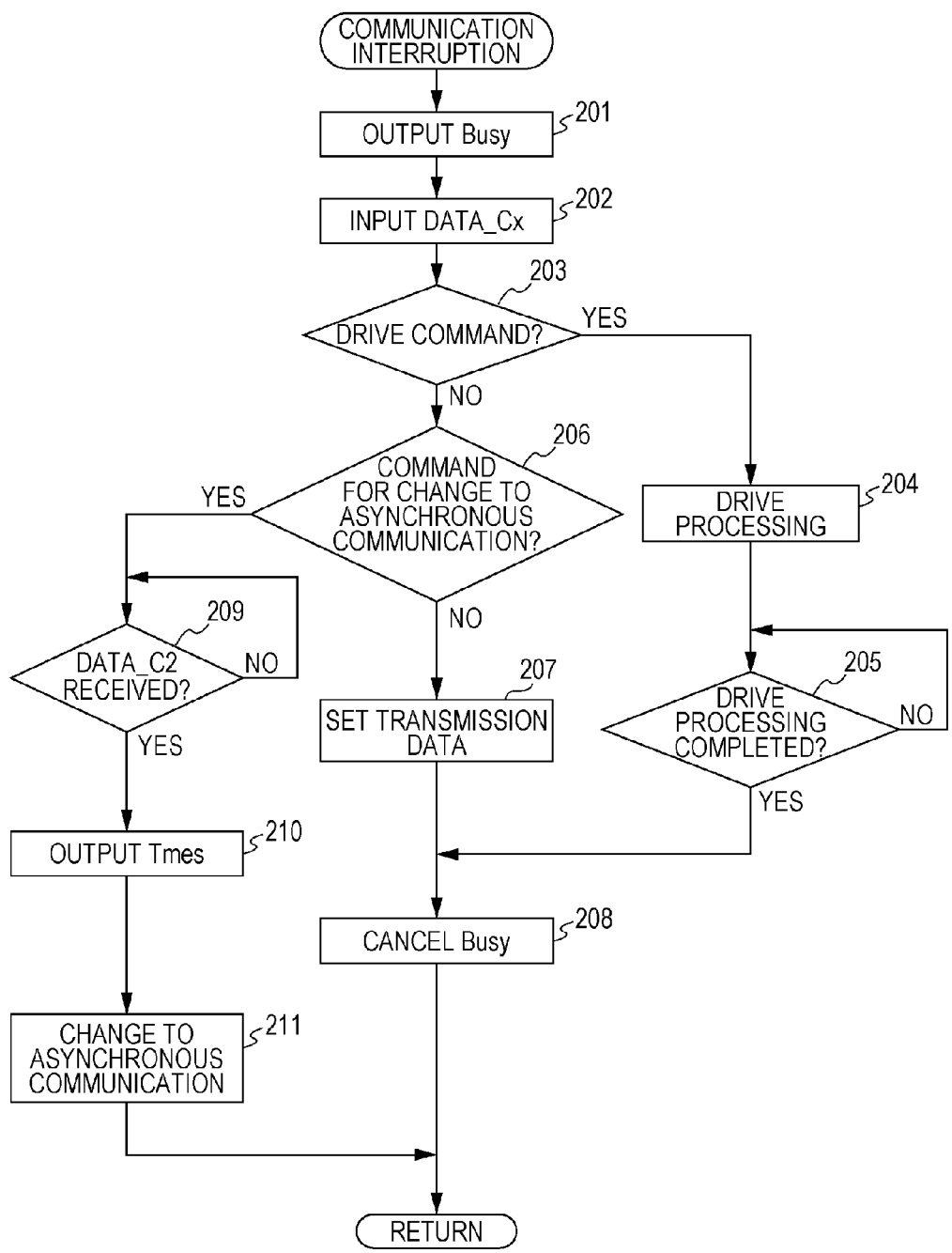
FIG. 12 is an operation flowchart of the lens microcomputer.

Next, an operation flow of the lens microcomputer 21 relating to information communication with the camera will be described with reference to a flowchart in FIG. 12.

When the interchangeable lens 2 is attached to the camera 1, receives the power from the camera, and the lens microcomputer 21 becomes operable, the lens microcomputer 21 first performs setting for the communication control circuit 33 and the I/O control circuits 35 to 37 as the slave of the communication by the synchronization method. This setting has been described in step 101 in FIG. 7. If interruption occurs due to the synchronous communication against the camera in this state, the operation flow is executed.

First, the terminal that receives the synchronous clock signal CLK is set at L level, so that the camera can judge that the lens is in the Busy state (step 201). The transmission data DATA_C1 that is transmitted from the camera and input to the receive shift register is input, and the content of the data is analyzed (step 202). Although the transmission data from the camera is DATA_C1, the data is named as DATA_Cx in the flowchart because DATA_C2 etc. may be transmitted in the subsequent process.

It is determined whether or not the content of the transmission data DATA_C1 from the camera is a drive command for the actuator in the lens (step 203).

Driving processing for the actuator in the lens is performed in accordance with the content of the transmission data DATA_C1 from the camera (step 204). Then, it is judged whether or not the processing relating to driving of the actuator in the lens is ended and the lens can receive next communication from the camera (step 205). If the lens can receive next communication, the process goes to step 208.

If the content of the transmission data DATA_C1 from the camera is not a drive command for the actuator in the lens in step 203, the process goes to step 206. It is judged whether or not the content of the transmission data DATA_C1 from the camera is a request for the output of the baud rate adjustment pulse Tmes to change the communication to asynchronous communication (step 206). If the output of the baud rate adjustment pulse Tmes is not requested, it is considered that the content is a data transmission request for the lens information, and the process goes to step 207.

In step 207, the data of the lens information, which is requested by the transmission data DATA_C1 from the camera, is set in the transmit shift register. If the requested lens information is lens information indicative of the type and name of the interchangeable lens or whether or not the interchangeable lens is the new type available for asynchronous communication, the information data is set. The terminal that receives the synchronous clock signal CLK is set at H level, so that the camera can judge that the lens is not in the Busy state (step 208).

If the content of the transmission data DATA_C1 from the camera is the request for the output of the baud rate adjustment pulse Tmes to change the communication to asynchronous communication in step 206, the process goes to step 209. In step 209, the process waits for transmission of transmission data DATA_C2 that serves as a timing trigger to perform the output of the baud rate adjustment pulse from the camera. Meanwhile, as described in step 104 in FIG. 4, the lens microcomputer 21 sets a predetermined count value for the output of the baud rate adjustment pulse Tmes in the counter/timer circuit 34. When the data is received, the process goes to step 210. The terminal that receives the synchronous clock signal CLK is set at L level simultaneously when counting is started by the counter/timer circuit 34 (step 210). The terminal that receives the synchronous clock signal CLK is set at H level simultaneously when counting by the predetermined value is completed by the counter/timer circuit 34. Thus, the output of the baud rate adjustment pulse Tmes is completed. Then, the lens microcomputer 21 changes setting for the communication method with the camera, and performs setting for the communication control circuit 33 and the I/O control circuits 35 to 37 to make asynchronous communication (step 211). In the subsequent process, the communication with the camera is made by asynchronous communication, which has been described with reference to FIG. 8.

If the interchangeable lens available for asynchronous communication is attached to a camera unavailable for asynchronous communication, the steps from step 209 to step 211 are not executed. In this case, the command that requests the output of the baud rate adjustment pulse Tmes is not transmitted from the camera. Hence, in this case, synchronous communication is continued.

The description for the first embodiment is ended.

Modification of First Embodiment

The above-described first embodiment is an embodiment for the representative camera and interchangeable lens that are implementations of the present invention. However, the embodiment covers not all conceivable embodiments.

The output terminal for the baud rate adjustment pulse Tmes that is output by the lens as described in step 105 etc. in FIG. 7 is not limited to the CLK terminal according to the first embodiment. The output terminal may be the DOC terminal or the DOL terminal. For example, if the output terminal for the baud rate adjustment pulse Tmes is the DOL terminal, a circuit configuration is provided such that when the lens outputs Tmes, the signal is input from the DOL terminal to the counter/timer circuit 34 in the camera. Also, the baud rate adjustment pulse Tmes output by the lens corresponds to a section from falling to rising of the signal output according to the first embodiment. However, it is not limited to the embodiment. Also, if the method is changed between the open-drain method and the CMOS method as described in PTL 1, it is preferable that the circuit is changed to the CMOS method and then the lens outputs the baud rate adjustment pulse Tmes. Accordingly, corruption due to delay less appears in the output waveform.

In the first embodiment, the output timing of the baud rate adjustment pulse Tmes output by the lens is immediately after the reception of the DATA_C2. However, this is merely an example, and is not limited to that timing.

In many cases, the characteristics of electronic components, such as a microcomputer and an oscillator used for the oscillator circuit of the microcomputer, may change with temperature. The oscillation frequency may frequently change within a certain range due to a change in temperature. Thus, it is preferable to perform the baud rate adjustment at other timing in addition to the timing immediately before the communication is changed from synchronous communication to asynchronous communication as described in step 105 etc. in FIG. 7. To be more specific, the output of the temperature sensor 19 is monitored at a certain time interval during the operation of the camera microcomputer 13, and the baud rate adjustment may be performed if a change in temperature occurs by a predetermined degree or higher.

Second Embodiment

In the first embodiment, the camera measures the time of the baud rate adjustment pulse Tmes that is output by the interchangeable lens, so that the camera performs the baud rate adjustment. Alternatively, the lens may measure the time of a baud rate adjustment pulse Tmes that is output by the camera, and the lens may transmit the data to the camera, so that the camera performs the baud rate adjustment. Now, a second embodiment is described below with reference to FIGS. 13 to 16.

Configurations of the camera and lens in the second embodiment are similar to those described in the first embodiment with reference to FIGS. 1 to 3.

Communication Setting Operation Flow of Camera Microcomputer 13

An operation flow of the camera microcomputer 13 relating to communication setting with the interchangeable lens is similarly started from step 111 in FIG. 10. A process similar to that of the first embodiment is performed, and it is determined whether or not the currently attached interchangeable lens is the II-type lens available for asynchronous communication in step 116 in FIG. 10.

If the lens is the II-type lens, the camera microcomputer 13 checks the input level of the terminal that outputs the synchronous clock signal CLK and judges whether the Busy state of the lens is canceled or not (step 501). If the input level of the terminal that outputs the signal CLK is at H level and hence the lens is not in the Busy state, the process goes to step 502.

Data DATA_C1 that is transmitted to the interchangeable lens is set in the transmit shift register and synchronous communication is made (step 502). Since a pulse of measurement for baud rate adjustment when asynchronous communication is made is output to the interchangeable lens immediately after this communication, the content of DATA_C1 is a command that requests measurement for the pulse width of that pulse.

The input level of the terminal that outputs the synchronous clock signal CLK is checked, and it is judged whether the Busy state of the lens is canceled or not (step 503). If the terminal that outputs the signal CLK is at H level and hence the lens is not in the Busy state, the process goes to step 504.

In response to the cancellation of the Busy state in the lens, the camera microcomputer 13 sets the CLK signal at L output, so as to start the output of the baud rate adjustment pulse Tmes (step 504). When the baud rate adjustment pulse Tmes is output, the counter/timer circuit 34 starts time measurement.

The process waits until the counter/timer circuit 34 ends the time measurement for a predetermined time (step 505). When the time measurement for the predetermined time is ended, the process goes to step 506. In step 506, the CLK signal is set at H output, and hence the output of the baud rate adjustment pulse Tmes is ended.

Figure 16:
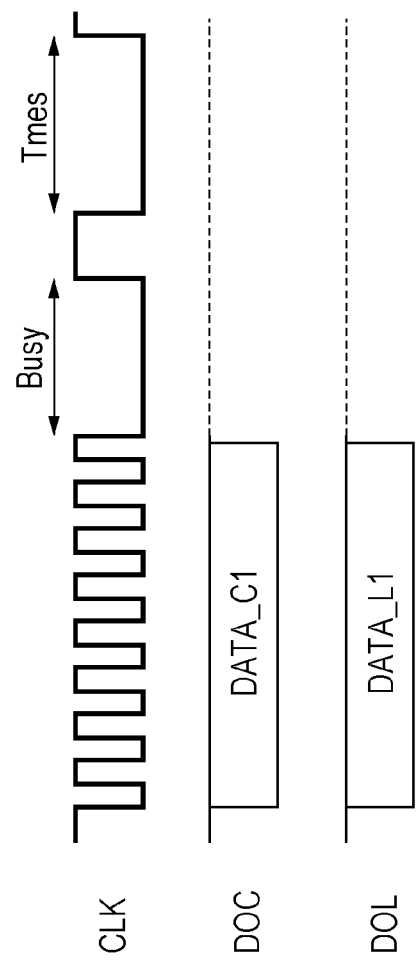
FIG. 16 is a timing chart of communication signals between a camera and an interchangeable lens according to the second embodiment.

FIG. 16 is a timing chart of communication signals between the camera and the interchangeable lens in the respective steps from step 502 to step 506 described above.

The lens outputs Busy for the CLK signal, and the camera outputs Tmes.

Next, the camera microcomputer 13 requests the interchangeable lens to transmission data obtained by measuring the output time of the baud rate adjustment pulse Tmes to the camera (step 507). The communication method herein is similar to that described with reference to FIG. 9 etc. Data DATA_C1 that is transmitted to the interchangeable lens is a transmission request command for the measurement data of the baud rate adjustment pulse Tmes. Reception data DATA_L2 is transmission data from the lens in response to the reception data.

With the measurement data of the interchangeable lens acquired in step 507, the camera microcomputer 13 can recognize information relating to a relative shift in accuracy of and oscillation frequency of the lens microcomputer 21 with respect to the accuracy of an oscillation frequency of the camera microcomputer 13. A baud rate that serves as a transmission rate when asynchronous communication is made is determined on the basis of the information (step 508).

Then, the camera microcomputer 13 changes setting for the communication method with the interchangeable lens, and performs setting for the communication control circuit 33 and the I/O control circuits 35 to 37 to make asynchronous communication. Also, the baud rate serving as the transmission rate and determined in step 508 is set in the communication control circuit 33. Accordingly, the communication is changed to asynchronous communication (step 509). In the subsequent process, the communication with the interchangeable lens is made by the asynchronous communication method as described with reference to FIG. 8.

Information Communication Operation Flow of Lens Microcomputer 21

Figure 14:
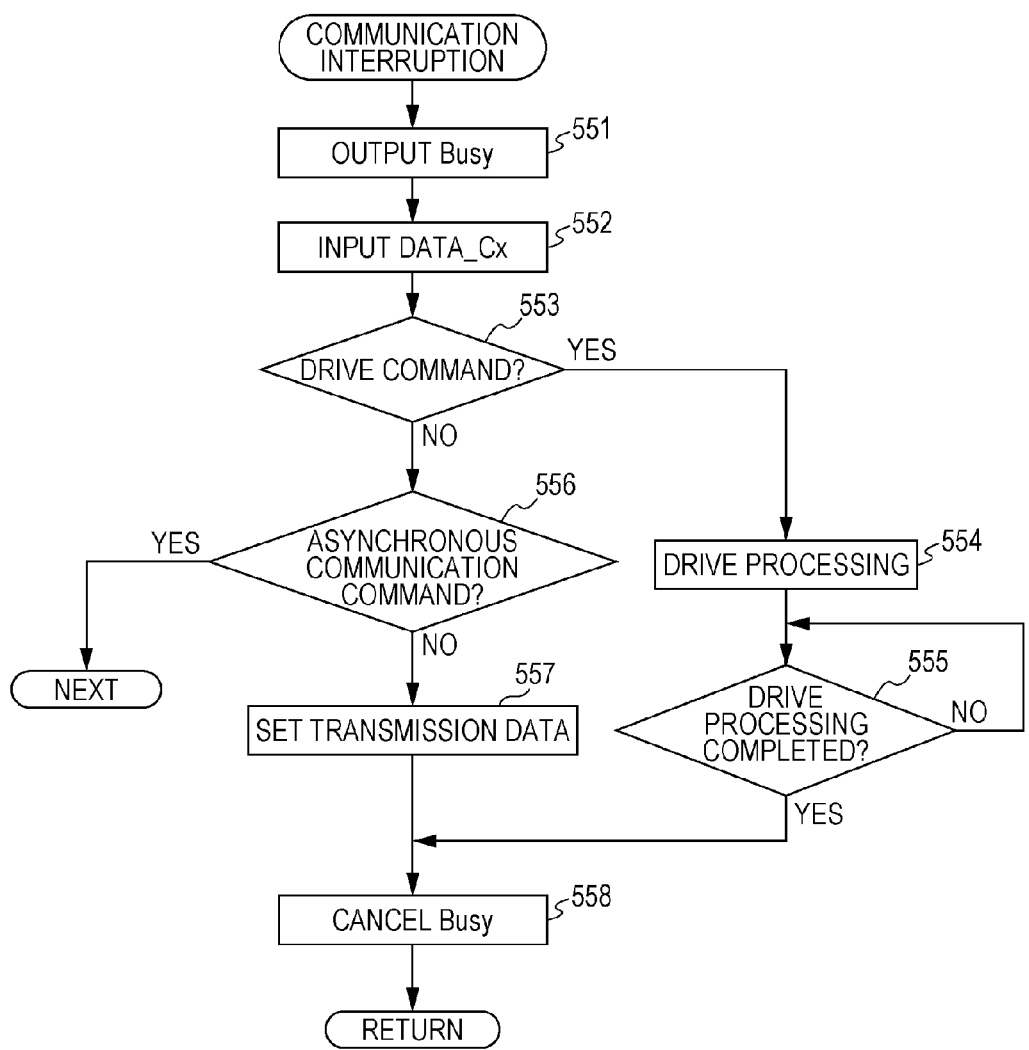
FIG. 14 is an operation flowchart of a lens microcomputer according to the second embodiment.

Next, an operation flow of the lens microcomputer 21 relating to information communication with the camera according to the second embodiment will be described with reference to flowcharts in FIGS. 14 and 15.

When the interchangeable lens 2 is attached to the camera 1, receives power from the camera, and the lens microcomputer 21 becomes operable, the lens microcomputer 21 first performs setting for the communication control circuit 33 and the I/O control circuits 35 to 37 as the slave of the communication by the synchronous communication method. If interruption occurs due to synchronous communication from the camera in this state, the operation flow in FIG. 14 is executed.

The terminal that receives the synchronous clock signal CLK is set at L level, so that the camera can judge that the lens is in the Busy state (step 551). The transmission data DATA_C1 that is transmitted from the camera and input to the receive shift register is input, and the content of the data is analyzed (step 552). Although the transmission data from the camera is DATA_C1, the data is named as DATA_Cx in the flowchart because DATA_C2 etc. may be transmitted in the subsequent process.

It is determined whether or not the content of the transmission data DATA_C1 from the camera is a drive command for the actuator in the lens (step 553).

If the content indicates the drive command for the actuator, drive processing is performed for the actuator in the lens in accordance with the content of the data DATA_C1 transmitted from the camera (step 554). Then, it is judged whether or not the processing relating to driving of the actuator in the lens is ended and the lens can receive next communication from the camera (step 555). If the lens can receive next communication, the process goes to step 558.

If the content of the data DATA_C1 transmitted from the camera is not the drive command for the actuator in the lens in step 553, the process goes to step 556. In step 556, it is judged whether the content of the data DATA_C1 transmitted from the camera is a request for change of communication to asynchronous communication, a request for execution of time measurement for the baud rate adjustment pulse Tmes, or a request for transmission of the time measurement result of the baud rate adjustment pulse Tmes. If the content does not indicate one of the above requests, it is considered that the content is a data transmission for lens information, and the process goes to step 557.

In step 557, the data of the lens information, which is requested by the transmission data DATA_C1 from the camera, is set in the transmit shift register. If the requested lens information is lens information indicative of the type and name of the interchangeable lens or whether or not the interchangeable lens is the new type available for asynchronous communication, the information data is set. The terminal that receives the synchronous clock signal CLK is set at H level, so that the camera can judge that the lens is not in the Busy state (step 558).

Figure 15:
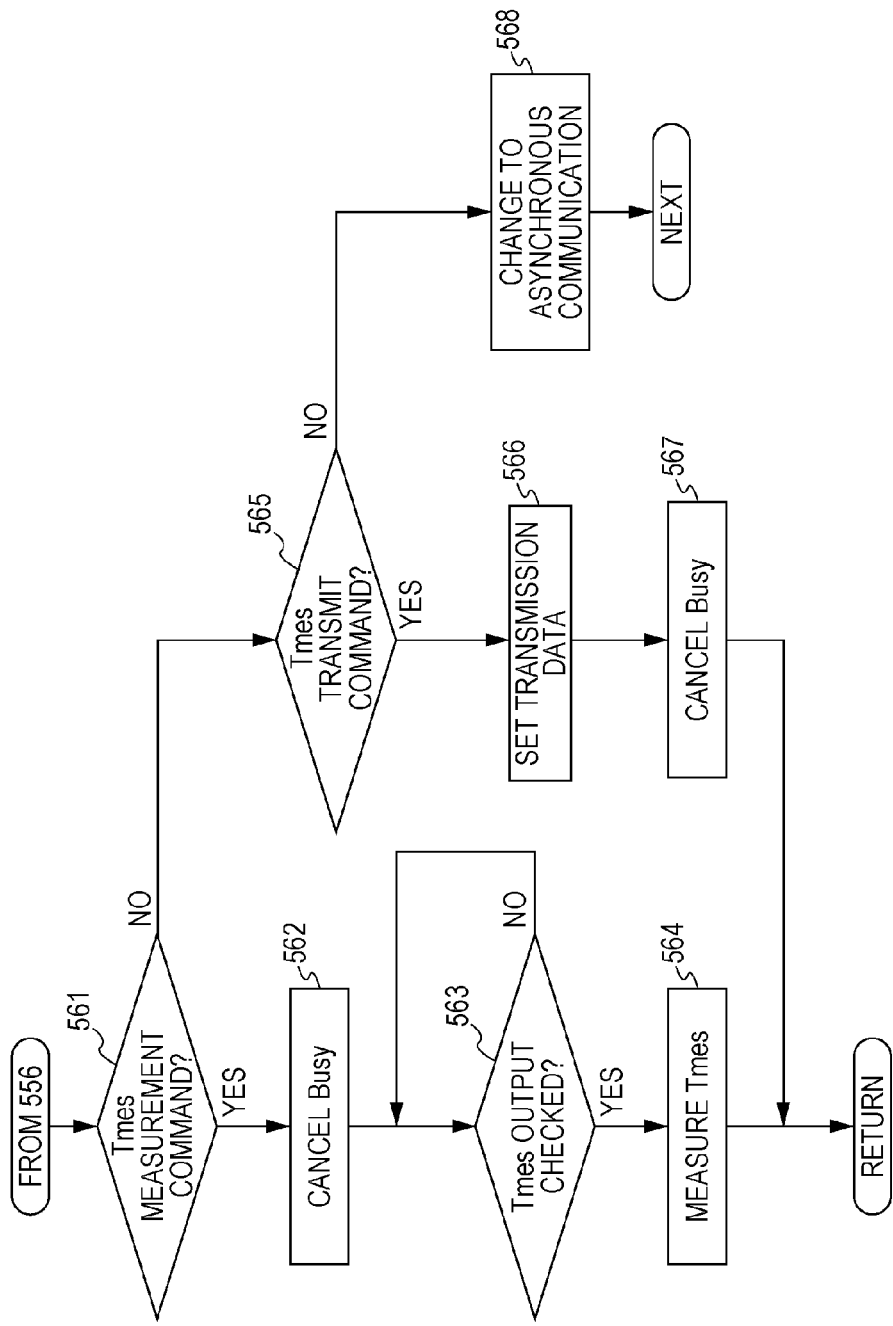
FIG. 15 is an operation flowchart of the lens microcomputer according to the second embodiment.

If the content of the data DATA_C1 transmitted from the camera is the request for change of communication to asynchronous communication in step 556, the process goes to step 561 in FIG. 15. Also, if the content of the data DATA_C1 is the request for execution of time measurement for the baud rate adjustment pulse Tmes, or the request for transmission of the time measurement result of the baud rate adjustment pulse Tmes, the process goes to the same step.

In step 561, it is judged whether or not the content of the data DATA_C1 transmitted from the camera is the request for execution of time measurement for the baud rate adjustment pulse Tmes. If the content indicates the execution of time measurement, the process goes to step 562.

In step 562, the terminal that receives the synchronous clock signal CLK is set at H level, so that the camera can judge that the lens is not in the Busy state. The process waits until the camera outputs the baud rate adjustment pulse Tmes in response to the CLK signal (step 563). When the camera outputs the baud rate adjustment pulse Tmes, the counter/timer circuit 34 starts time measurement, and measures a time until the baud rate adjustment pulse Tmes becomes at H level (step 564).

If the content of the transmission data DATA_C1 from the camera is not the execution of time measurement for the baud rate adjustment pulse Tmes in step 561, the process goes to step 565.

In step 565, it is checked whether or not the content of the data DATA_C1 transmitted from the camera is the request for transmission of the time measurement result of the baud rate adjustment pulse Tmes. If YES, the process goes to step 566.

In step 566, the time measurement data of the baud rate adjustment pulse Tmes measured in step 564 is set in the transmit shift register. The terminal that receives the synchronous clock signal CLK is set at H level, so that the camera can judge that the lens is not in the Busy state (step 567). Then, the synchronous clock signal CLK is output from the camera and serial communication is executed. Accordingly, the time measurement data of the baud rate adjustment pulse Tmes is transmitted to the camera.

If the content of the transmission data DATA_C1 from the camera is not the request for transmission of the time measurement result of the baud rate adjustment pulse Tmes in step 565, the content is the request for change of communication to asynchronous communication. The process goes to step 568. In step 568, the lens microcomputer 21 changes setting for the communication method with the camera, and performs setting for the communication control circuit 33 and the I/O control circuits 35 to 37 to make asynchronous communication. In the subsequent process, the communication with the camera is made by asynchronous communication, which has been described with reference to FIG. 8.

Now, the description for the second embodiment is ended.

Figure 13:
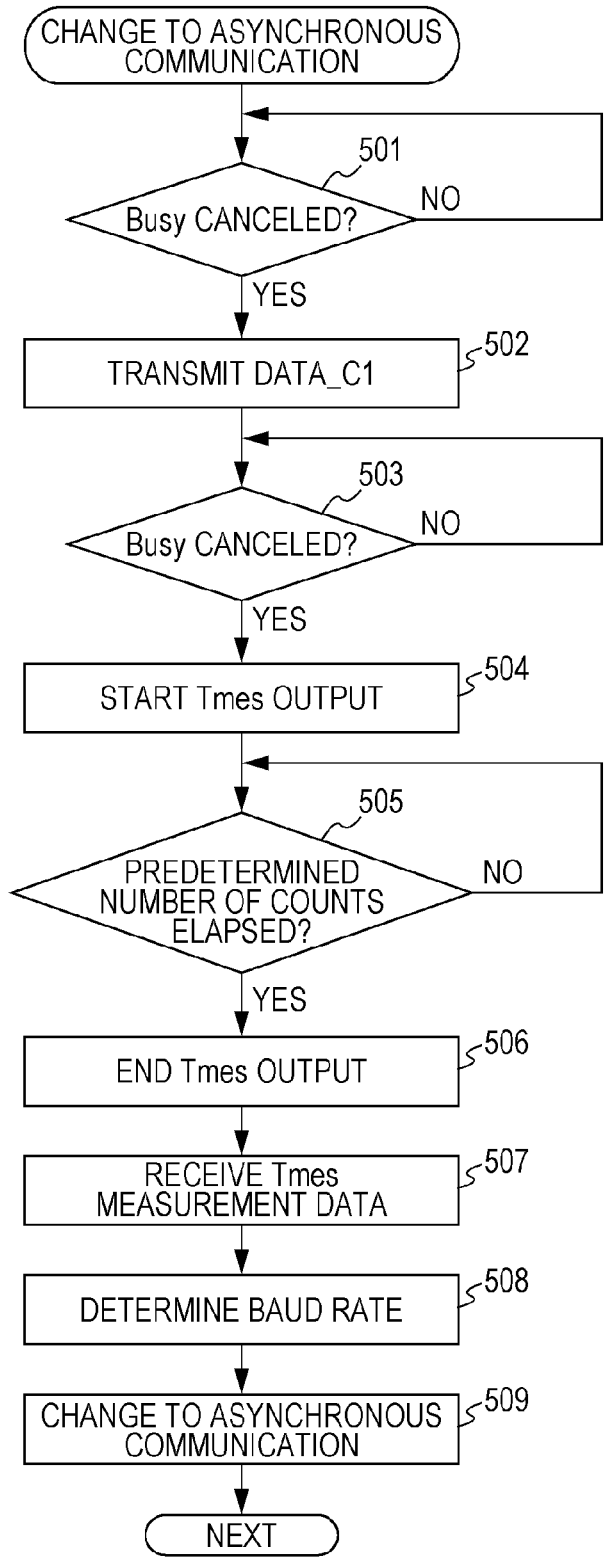
FIG. 13 is an operation flowchart of a camera microcomputer according to a second embodiment.

The output terminal for the baud rate adjustment pulse Tmes that is output by the camera as described in step 504 etc. in FIG. 13 is not limited to the CLK terminal according to the second embodiment. The output terminal may be the DOC terminal or the DOL terminal. Also, the baud rate adjustment pulse Tmes output by the camera corresponds to a section from falling to rising of the signal output. However, it is not limited to the embodiment. If the method is changed between the open-drain method and the CMOS method as described in PTL 1, it is preferable that the circuit is changed to the CMOS method and then the lens outputs the baud rate adjustment pulse Tmes because corruption due to delay less appears in the output waveform.

In the second embodiment, the output timing of the baud rate adjustment pulse Tmes output from the camera is immediately after the cancellation of Busy in the lens. However, this is merely an example, and is not limited to that timing.

In many cases, the characteristics of electronic components, such as a microcomputer and an oscillator used for the oscillator circuit of the microcomputer, may change with temperature. The oscillation frequency may frequently change within a certain range due to a change in temperature. Thus, like the first embodiment, it is preferable to perform the baud rate adjustment at other timing in addition to the timing immediately before communication is changed from synchronous communication to asynchronous communication as described above.

As described in the first and second embodiments, with the subject application, the interchangeable lens does not have to perform processing for outputting a Busy signal or canceling the Busy state every time when communication interruption occurs. The operating performances can be improved. Also, since the transmission rate is determined when the communication between the camera and the interchangeable lens is changed to the asynchronous communication method, a sampling error of asynchronous communication due to an error between oscillation frequencies of the camera and interchangeable lens can be prevented from occurring. Accordingly, when high-speed communication is performed while individual variability is present, asynchronous communication can be reliably executed.

With the technical idea of the subject application, an image pickup apparatus, which is available for communication with an interchangeable lens that can further improve an operating performance and for communication with an old-type interchangeable lens using a conventional communication method while compatibility is maintained, and an interchangeable lens can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image pickup apparatus to which an interchangeable lens is attachable, the apparatus comprising:
   first and second terminals for communication with the interchangeable lens; and
   a control unit configured to judge, when the communication is made with the attached interchangeable lens, in a first communication mode in which a clock signal is output via the first terminal and communication is performed based on the clock signal, whether or not the attached interchangeable lens is available for a second communication mode in which communication is performed without outputting the clock signal via the first terminal,
   wherein the control unit continues the first communication mode when the control unit judges that the interchangeable lens is unavailable for the second communication mode,
   wherein the control unit transmits a predetermined signal for baud rate adjustment of the second communication mode via the second terminal, and
   determines a baud rate of the second communication mode when the control unit judges that the interchangeable lens is available for the second communication mode.

2. The image pickup apparatus according to claim 1, wherein, in the second communication mode, the control unit communicates with the interchangeable lens at the determined baud rate of the second communication mode.

3. The image pickup apparatus according to claim 1, wherein the control unit changes communication mode from the first communication mode to the second communication mode after determining the baud rate of the second communication mode.

4. The image pickup apparatus according to claim 1, wherein the control unit measures time while a signal level of the first or second terminal is kept at a predetermined level, and determines the baud rate of the second communication mode based on the measured time.

5. The image pickup apparatus according to claim 4, wherein the control unit determines the baud rate of the second communication mode based on a difference between the measured time and predetermined time.

6. The image pickup apparatus according to claim 4, wherein the signal level of the first or second terminal is kept at the predetermined level for a time corresponding to a predetermined clock count by the interchangeable lens.

7. The image pickup apparatus according to claim 1, wherein the control unit controls a signal level of the first or second terminal to keep at a predetermined level for a time corresponding to a predetermined clock count,
   wherein the control unit receives data on time while the signal level of the first or second terminal is kept at the predetermined level measured by the interchangeable lens via the second terminal, and determines the baud rate of the second communication mode based on the received data.

8. The image pickup apparatus according to claim 7, wherein the control unit determines the baud rate of the second communication mode based on a difference between the time corresponding to the received data and the time corresponding to the predetermined clock count.

9. An interchangeable lens attachable to an image pickup apparatus, the lens comprising:
   first and second terminals for communication with the image pickup apparatus; and
   a lens side control unit configured to transmit, when communication is made with the image pickup apparatus with the lens attached, in a first communication mode in which a clock signal is input via the first terminal and communication is performed based on the clock signal, data that indicates the interchangeable lens is available for a second communication mode in which communication is performed without inputting the clock signal via the first terminal,
   wherein the lens side control unit receives a predetermined signal for baud rate adjustment of the second communication mode via the second terminal, and communicates with the image pickup apparatus in the second communication mode at a baud rate determined by the image pickup apparatus.

10. The interchangeable lens according to claim 9, wherein when the lens side control unit receives the predetermined signal, the lens side control unit controls a signal level of the first or second terminal to keep at a predetermined level for a time corresponding to a predetermined clock count.

11. The interchangeable lens according to claim 10, wherein the lens side control unit changes communication mode from the first communication mode to the second communication mode after controlling the signal level of the first or second terminal to keep at the predetermined level for the time corresponding to the predetermined clock count.

12. The interchangeable lens according to claim 9, wherein when the lens side control unit receives the predetermined signal, the lens side control unit measures time while a signal level of the first or second terminal is kept at a predetermined level, and transmits data on the measured time to the image pickup apparatus via the second terminal.

13. The interchangeable lens according to claim 12, wherein the lens side control unit changes communication mode from the first communication mode to the second communication mode after transmitting the data on the measured time to the image pickup apparatus and receiving data on request for change of communication mode from the image pickup apparatus.

14. A method of controlling an image pickup apparatus to which an interchangeable lens is attachable, that includes first and second terminals for communication with the interchangeable lens, the method comprising:
   judging, when the communication is made with the attached interchangeable lens, in a first communication mode in which a clock signal is output via the first terminal and communication is performed based on the clock signal, whether or not the attached interchangeable lens is available for a second communication mode in which communication is performed without outputting the clock signal via the first terminal,
   continuing the first communication mode when it is judged that the interchangeable lens is unavailable for the second communication mode,
   transmitting a predetermined signal for baud rate adjustment of the second communication mode via the second terminal, and determining a baud rate of the second communication mode when it is judged that the interchangeable lens is available for the second communication mode.

15. A method of controlling an interchangeable lens attachable to an image pickup apparatus, that includes first and second terminals for communication with the image pickup apparatus, the method comprising:

transmitting, when communication is made with the image pickup apparatus with the lens attached, in a first communication mode in which a clock signal is input via the first terminal and communication is performed based on the clock signal, data that indicates the interchangeable lens is available for a second communication mode in which communication is performed without inputting the clock signal via the first terminal, receiving a predetermined signal for baud rate adjustment of the second communication mode via the second terminal, and communicating with the image pickup apparatus in the second communication mode at a baud rate determined by the image pickup apparatus.

* * * * *